US006947430B2

(12) United States Patent
Bilic et al.

(10) Patent No.: US 6,947,430 B2
(45) Date of Patent: Sep. 20, 2005

(54) NETWORK ADAPTER WITH EMBEDDED DEEP PACKET PROCESSING

(75) Inventors: Hrvoje Bilic, Haifa (IL); Giora Biran, Zichron Yáakov (IL); Igor Chirashnya, Haifa (IL); Georgy Machulsky, Naharia (IL); Claudiu Schiller, Haifa (IL); Tal Sostheim, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 09/810,941

(22) Filed: Mar. 16, 2001

(65) Prior Publication Data

US 2001/0053148 A1 Dec. 20, 2001

Related U.S. Application Data (60) Provisional application No. 60/192,085, filed on Mar. 24, 2000.

(51) Int. Cl.[7] ............................................. H04L 12/54
(52) U.S. Cl. .................... 370/395.71; 370/466; 370/474
(58) Field of Search .......................... 370/395.7, 395.71, 370/395.72, 412, 413, 415, 417, 419, 428, 429, 466, 469, 474

(56) References Cited

U.S. PATENT DOCUMENTS

| | | | | |
|---|---|---|---|---|
| 5,590,122 A | * | 12/1996 | Sandorfi et al. ............. 370/394 |
| 5,699,361 A | * | 12/1997 | Ding et al. .................. 370/431 |
| 5,706,425 A | * | 1/1998 | Unekawa ..................... 714/55 |
| 5,815,501 A | * | 9/1998 | Gaddis et al. ............... 370/402 |
| 5,917,824 A | * | 6/1999 | Brueckheimer et al. ..... 370/397 |
| 6,032,190 A | * | 2/2000 | Bremer et al. .............. 709/238 |
| 6,041,043 A | * | 3/2000 | Denton et al. .............. 370/254 |
| 6,078,733 A | * | 6/2000 | Osborne ...................... 709/250 |
| 6,137,796 A | * | 10/2000 | Derango et al. ............ 370/389 |
| 6,314,477 B1 | * | 11/2001 | Cowger et al. ................ 710/22 |
| 6,343,072 B1 | * | 1/2002 | Bechtolsheim et al. ..... 370/351 |
| 6,359,887 B1 | * | 3/2002 | Brockhage et al. ......... 370/394 |
| 6,470,015 B1 | * | 10/2002 | Koga et al. ............... 370/395.1 |
| 6,493,347 B2 | * | 12/2002 | Sindhu et al. ............ 0370/401 |
| 6,502,135 B1 | * | 12/2002 | Munger et al. ............. 709/225 |
| 6,680,938 B1 | * | 1/2004 | Hammermeister et al. .. 370/360 |
| 6,810,431 B1 | * | 10/2004 | Narisi et al. ................ 709/250 |
| 6,822,960 B1 | * | 11/2004 | Manchester et al. ........ 370/394 |

OTHER PUBLICATIONS

Postel, RFC 791 of the U.S. Defense Advanced Research Projects Agency (DARPA), entitled "Internet Protocol: DARPA Internet Program Protocol Specification", 1981, 45 pages.

Postel, RFC 793, entitled "Transmission Control Protocol: DARPA Internet Program Protocol Specification", 1981, 84 pages.

Postel, RFC 768pf the University of Souther California, Information Sciences Institute, entitled "User Datagram Protocol Datagram PRotocol", 1980, 5 pages.

\* cited by examiner

*Primary Examiner*—Kwang Bin Yao
(74) *Attorney, Agent, or Firm*—Darby & Darby (57) ABSTRACT

A network interface device includes host interface logic, arranged to receive from a host processor a frame of outgoing data that includes outgoing header information and outgoing payload data, and to separate the header information from the payload data. A transmit protocol processor is coupled to read and process the outgoing header information from the outgoing header memory so as to generate at least one outgoing packet header in accordance with a predetermined network protocol. Transmit logic is coupled to receive and associate the at least one outgoing packet header with the outgoing payload data from the outgoing data memory, so as to generate at least one outgoing data packet for transmission over a network in accordance with the protocol.

46 Claims, 5 Drawing Sheets

NETWORK ADAPTER WITH EMBEDDED DEEP PACKET PROCESSING

CROSS-REFERENCE TO RELATED APPLICATION

This application claims the benefit of U.S. Provisional Patent Application 60/192,085, filed Mar. 24, 2000, which is incorporated herein by reference.

FIELD OF THE INVENTION

The present invention relates generally to data communications over packet networks, and specifically to methods and devices for high-speed packet header processing.

BACKGROUND OF THE INVENTION

In recent years, the speed of networking hardware has increased by two or three orders of magnitude, enabling packet networks such as Gigabit Ethernet and InfiniBand™ to operate at speeds in excess of 1 Gb/s. Network interface adapters for these high-speed networks typically provide dedicated hardware for physical layer and data link layer processing (Layers 1 and 2 in the Open Systems Framework model). This hardware is capable of operating at wire speed, i.e., transmitting and receiving packets at the full, specified speed at which the network itself is capable of carrying data.

Higher-level protocols, however, are still processed for the most part by software running on host CPUs (central processing units) connected to the network. Common protocols of this sort include network layer (Layer 3) protocols, such as the Internet Protocol (IP), and transport layer (Layer 4) protocols, such as the Transport Control Protocol (TCP) and User Datagram Protocol (UDP), as well as protocols in layers 5 and above. Efforts to reduce the stack overheads of standard protocols used in packet networks, such as TCP/IP, have yielded only moderate improvements. Increases in the speed of host processors and memory access have not kept pace with the increases in network speed. As a result, software processing of protocol stacks has become the key bottleneck in packet network communications.

SUMMARY OF THE INVENTION

In preferred embodiments of the present invention, a network interface adapter comprises one or more embedded processors that perform deep packet processing, so as to relieve the host CPU of at least a part of the protocol processing burden. In the context of the present patent application and in the claims, the term "deep packet processing" is used to refer to any hardware-based processing of header information at or above the network protocol level (Layer 3). Preferably, the network interface adapter comprises an integrated circuit chip that includes two such embedded processors, one for processing packets for transmission over the network, based on data frames generated by the host CPU, and the other for processing data packets received over the network, for delivery as data frames to the host CPU. Offloading deep packet processing tasks from the host CPU to the embedded processors substantially increases the rate at which packets can be transferred to and from the host, thus enhancing the overall speed of network traffic.

Preferably, the network interface adapter comprises logic that separates the data into separate processing pipelines for header data and payload data in each of the transmit and receive paths. The header data are passed to a fast memory associated with the respective embedded processor, enabling the processor to access the data with minimal delay, typically within one or two processor clock cycles. By separating the header and payload data, the amount of fast memory needed by the network interface adapter is minimized, thus reducing the cost of the device. After the header data have been processed by the embedded processor, further logic in the network interface adapter synchronizes and recombines the header and payload data for network packet transmission (on the transmit path) or for writing as data frames to the host memory (on the receive path).

The embedded processors are programmed in microcode to deal with certain specific protocols used in the network, such as TCP/IP. The dedication of the processors to this task, along with the use of fast memory to hold the header data during processing, enables the network interface adapter to perform Layer 3 and higher-layer processing at wire speed. The network interface adapter can be configured to handle other protocols, not only at Layers 3 and 4, but also at higher layers, simply by reprogramming the microcode firmware of the embedded processors. Thus, the adapter can be used in a straightforward way to offload higher-level networks tasks from the host, as well, such as firewalls, load balancing, traffic management and other functions known in the art. These capabilities make the adapter useful not only in connecting host computers to the network, but also in other types of network devices, such as switches, routers and gateways.

There is therefore provided, in accordance with a preferred embodiment of the present invention, a network interface device, including:

host interface logic, arranged to receive from a host processor a frame of outgoing data that includes outgoing header information and outgoing payload data, and to separate the header information from the payload data;

an outgoing data memory, coupled to receive the outgoing payload data from the host interface logic;

an outgoing header memory, coupled to receive the outgoing header information from the host interface logic;

a transmit protocol processor, coupled to read and process the outgoing header information from the outgoing header memory so as to generate at least one outgoing packet header in accordance with a predetermined network protocol; and transmit logic, coupled to receive and associate the at least one outgoing packet header with the outgoing payload data from the outgoing data memory, so as to generate at least one outgoing data packet for transmission over a network in accordance with the protocol.

Preferably, the protocol includes a network layer protocol, most preferably an Internet Protocol (IP). Additionally or alternatively, the protocol includes a transport layer protocol, preferably a Transport Control Protocol (TCP) or a User Datagram Protocol (UDP).

Preferably, the outgoing data memory and the outgoing header memory include parallel first-in-first-out (FIFO) buffers, which are arranged to hold the outgoing payload data and outgoing header information, respectively, for a plurality of frames of outgoing data. Most preferably, the outgoing header memory includes a first FIFO buffer, coupled to hold the header information before it is processed by the protocol processor, and a second FIFO buffer, coupled to receive the at least one packet header from the protocol processor and to deliver it to the transmit logic. Additionally or alternatively, the outgoing header memory includes a fast memory, coupled to the transmit protocol processor so as to be accessed thereby in a single clock cycle of the processor.

In a preferred embodiment, at least the outgoing data and header memories and the transmit logic are contained together with the transmit protocol processor in a single integrated circuit chip, and the transmit protocol processor is coupled to the host interface logic so as to enable reprogramming of the transmit protocol processor.

Typically, the at least one outgoing packet header includes a plurality of outgoing packet headers, and the transmit logic is arranged to associate each of the outgoing packet headers with a corresponding portion of the outgoing payload data so as to generate a sequence of outgoing data packets.

Preferably, the at least one outgoing packet header includes a data length parameter, and the transmit logic is arranged to read the data for inclusion in the outgoing packet responsive to the data length parameter.

Preferably, the device includes:

receive logic, which is coupled to receive from the network an incoming data packet including incoming data that includes an incoming header and incoming payload data, and to select a header portion of the incoming data packet;

an incoming header memory, coupled to receive from the receive logic a header portion of the incoming data, which includes at least the incoming header;

an incoming data memory, coupled to receive from the receive logic a data portion of the incoming data, which includes at least the incoming payload data; and a receive protocol processor, coupled to read and process the header portion of the incoming data in accordance with the predetermined network protocol so as to generate incoming header information, wherein the host interface logic is coupled to receive and associate the incoming header information with the incoming payload data so as to generate an incoming data frame for delivery to the host processor.

Preferably, the transmit protocol processor and the receive protocol processor are contained together in a single integrated circuit chip, and the device includes a bus on the chip coupled to both the transmit and receive protocol processors. Most preferably, the device includes a shared memory, which is accessible to both the transmit and receive protocol processors via the bus.

There is also provided, in accordance with a preferred embodiment of the present invention, a network interface device, including:

receive logic, which is coupled to receive from a network in accordance with a predetermined network protocol an incoming data packet including incoming data that includes an incoming header and incoming payload data, and which is arranged to select a header portion of the incoming data packet;

an incoming header memory, coupled to receive from the receive logic a header portion of the incoming data, which includes at least the incoming header;

an incoming data memory, coupled to receive from the receive logic a data portion of the incoming data, which includes at least the incoming payload data;

a receive protocol processor, coupled to read and process the header portion of the incoming data in accordance with the predetermined network protocol so as to generate incoming header information; and host interface logic, which is coupled to receive and associate the incoming header information with the incoming payload data so as to generate an incoming data frame for delivery to a host processor.

Preferably, the data memory and the header memory include parallel first-in-first-out (FIFO) buffers, which are arranged to hold the data portion and the header portion, respectively, for a plurality of frames of incoming data. Most preferably, the header memory includes a first FIFO buffer, coupled to hold the header portion before it is processed by the protocol processor, and a second FIFO buffer, coupled to receive the header information from the protocol processor and to deliver it to the transmit logic. Additionally or alternatively, the header information includes an instruction to the host interface logic, indicating a length of the payload data to read from the data portion in the data memory for inclusion in the incoming data frame.

Typically, the data portion of the incoming data includes substantially all of the incoming data, and the header information includes an instruction to the host interface logic, indicating a length of the payload data to read from the data portion in the data memory for inclusion in the incoming data frame. Preferably, the receive logic includes a control register, which is programmable with a length parameter, responsive to which the receive logic determines how many bits to select for inclusion in the header portion.

Preferably, the host interface logic includes a direct memory access (DMA) engine, and the receive protocol processor is arranged to generate DMA descriptors along with the incoming header information, so that the DMA engine writes the incoming data frame to a memory of the host processor responsive to the descriptors.

There is additionally provided, in accordance with a preferred embodiment of the present invention, a method for transmitting data over a packet network, including:

receiving from a host processor a frame of outgoing data that includes outgoing header information and outgoing payload data;

writing the outgoing header information to an outgoing header memory;

writing the outgoing payload data to an outgoing payload memory, separate from the header memory;

reading and processing the outgoing header information from the outgoing header memory so as to generate at least one outgoing packet header in accordance with a predetermined network protocol; and associating the at least one outgoing packet header with the outgoing payload data from the outgoing data memory, so as to generate at least one outgoing data packet for transmission over the network in accordance with the protocol.

There is further provided, in accordance with a preferred embodiment of the present invention, a method for processing data received over a packet network, including:

receiving from a network in accordance with a predetermined network protocol an incoming data packet including incoming data that includes an incoming header and incoming payload data;

writing a header portion of the incoming data packet to an incoming header memory, the header portion including at least the incoming header;

writing a data portion of the incoming data to an incoming data memory, separate from the incoming header memory, the data portion including at least the incoming payload data;

reading and processing the header portion of the incoming data from the incoming header memory in accordance with the predetermined network protocol so as to generate incoming header information; and associating the incoming header information with the incoming payload data from the incoming data memory so as to generate an incoming data frame for delivery to a host processor.

In a preferred embodiment, writing the header portion includes programming a control register with a length parameter, and determining how many bits to select for inclusion in the header portion responsive to the length parameter, wherein programming the control register includes determining the length parameter based on a maximum header length permitted by the network protocol.

The present invention will be more fully understood from the following detailed description of the preferred embodiments thereof, taken together with the drawings in which:

DETAILED DESCRIPTION OF PREFERRED EMBODIMENT

Figure 1:
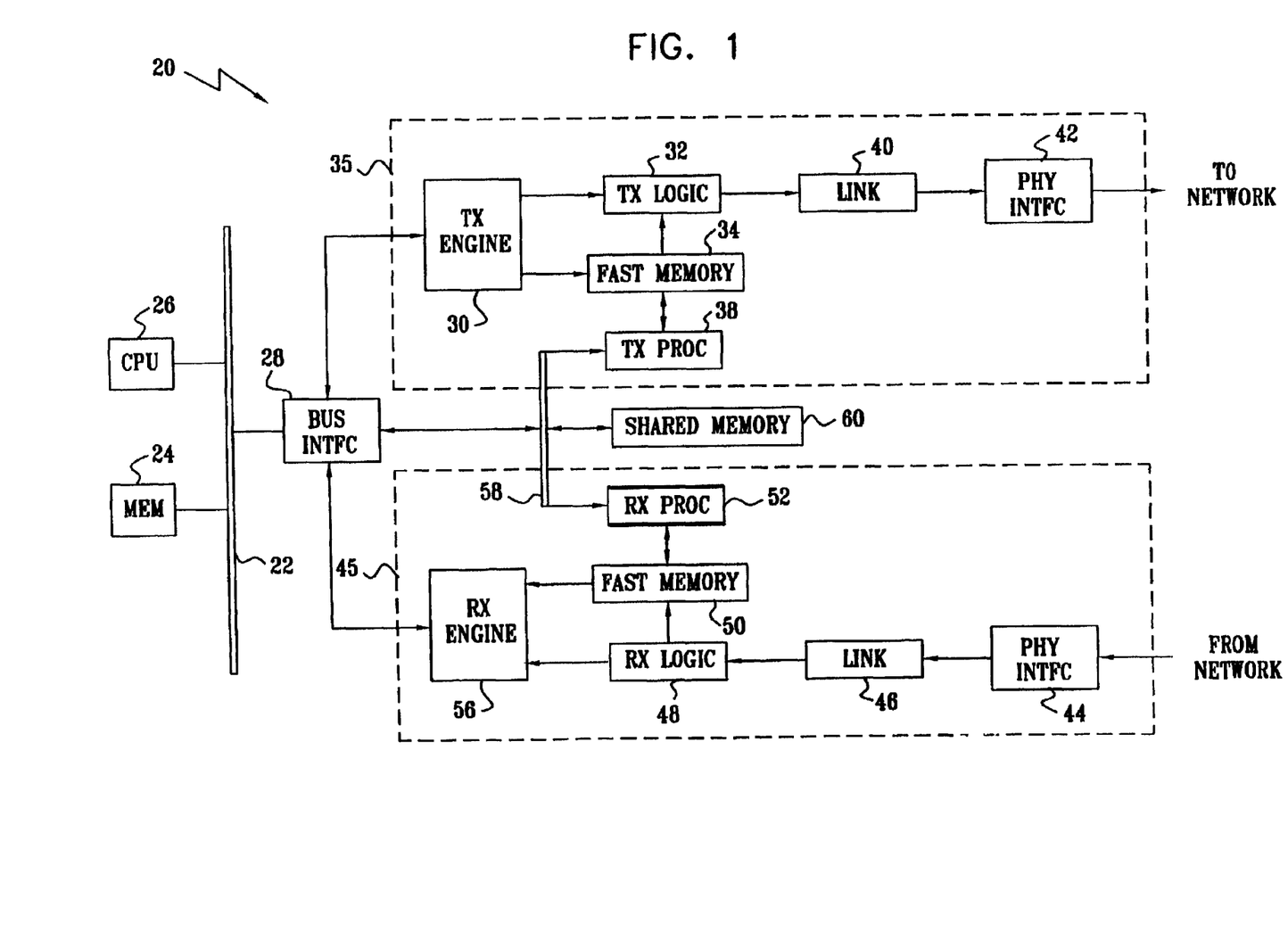
FIG. 1 is a block diagram that schematically illustrates a network interface adapter, in accordance with a preferred embodiment of the present invention.

FIG. 1 is a block diagram that schematically illustrates a network interface adapter 20, for interfacing between a host CPU 26 and a packet network, in accordance with a preferred embodiment of the present invention. In the illustrated embodiment, CPU 26 is linked to random access memory (RAM) 24 via a bus 22. The bus typically comprises a standard parallel bus, such as a Peripheral Component Interface (PCI) bus, as is known in the art. The network (not shown in the figures) typically comprises a switch fabric, local area network (LAN) or wide area network (WAN), as are likewise known in the art. For the purposes of the present embodiment, the network is assumed to use standard network protocols, such as TCP/IP or UDP/IP. The principles of the present invention, however, are equally applicable to other network configurations and protocols, as well as to alternative arrangements of CPU 26, memory 24 and bus 22. Therefore, the term "packet" as used herein should be understood to refer to substantially any type of datagrams used in a network, and "header" should be understood to refer to substantially any network protocol information contained in the datagrams, whether at the beginning, middle or end of the datagrams.

Adapter 20 comprises a transmit path 35 and a receive path 45. The elements of these paths are described briefly with reference to FIG. 1. Their operation is described in detail hereinbelow with reference to FIGS. 2–5.

A transmit engine 30 provides an interface between local applications run by CPU 26 and transmit path 35. Transmit engine 30 reads commands and frames of application data prepared by CPU 26 in memory 24, via a bus interface 28. The transmit engine sorts the header information in the frames from the payload data, passing the payload data to transmit logic 32, to await packetization, while passing the header data to a fast memory 34. This fast memory is linked in a zero-wait-state mode to a transmit processor 38, so that the processor and can typically read from and write to memory 34 in only one or two clock cycles. Processor 38 preferably comprises an embedded RISC processor, such as an IBM PowerPC™ processor, which also uses fast memory 34 to hold program instructions and data structures that it needs to access rapidly.

Transmit processor 38 reads the header data from fast memory 34 and then writes packet headers and instructions to the fast memory for the data packets that are to be transmitted over the network. Transmit logic 32 combines the headers with the data to form outgoing packets, with are passed to a data link layer interface 40. The link interface performs Layer 2 network functions, as are known in the art, and then passes the packets to a physical layer interface 42 for transmission over the network.

Receive path 45 receives incoming data packets via a physical layer interface 44 and data link layer interface 46. Link interface 46 passes the payload data of the incoming packets to receive logic 48, while a portion of the data containing the packet headers is passed to a fast memory 50 of a receive processor 52. The configuration of and interface between processor 52 and memory 50 are substantially similar to those of transmit processor 38 and memory 34. Transmit processor 38 and receive processor 52 are separated, however, in order to enable adapter 20 to simultaneously transmit and receive packets at full wire speed.

Receive processor 52 processes the header data that it reads from memory 50 and then writes frame headers and instructions to memory 50, for use in conveying the data to CPU 26. A receive engine 56 reads these headers and instructions and uses the information they contain to read the associated payload data from receive logic 48. The receive engine then writes data frames containing the header and payload data via bus interface 28 to memory 24, for subsequent processing by CPU 26.

Preferably, in addition to the dedicated elements of transmit path 35 and receive path 45, adapter 20 also includes elements that are shared by both paths, such as bus interface 28. The bus interface provides access from external bus 22 to an internal control bus 58 of the adapter. This access path is used to load microcode into the adapter, providing the program instructions that processors 38 and 52 execute in carrying out the protocol processing functions described herein. The processors can be reprogrammed in this manner to change their processing protocols and/or to add other processing functions to be executed by adapter 20. Bus 58 is also used by processors 38 and 52 to access a shared memory 60, containing firmware and data for use by either or both processors in tasks that are not time-critical.

Preferably, all of the elements of adapter 20 are contained in a single integrated circuit chip, preferably an application-specific integrated circuit (ASIC) that contains embedded processors 38 and 52. Shared memory 60, however, preferably comprises both on-chip and off-chip memory, so that a larger volume of memory can be made available to processors 38 and 52 without burdening the ASIC. Alternatively, adapter may be assembled from a number of separate logic, processing and memory components. To achieve wire-speed protocol processing, however, it is important that processors 38 and 52 have rapid access to respective memories 34 and 50. Therefore, more highly-integrated designs of adapter 20 are favored from the points of view of both speed and cost.

Figure 2:
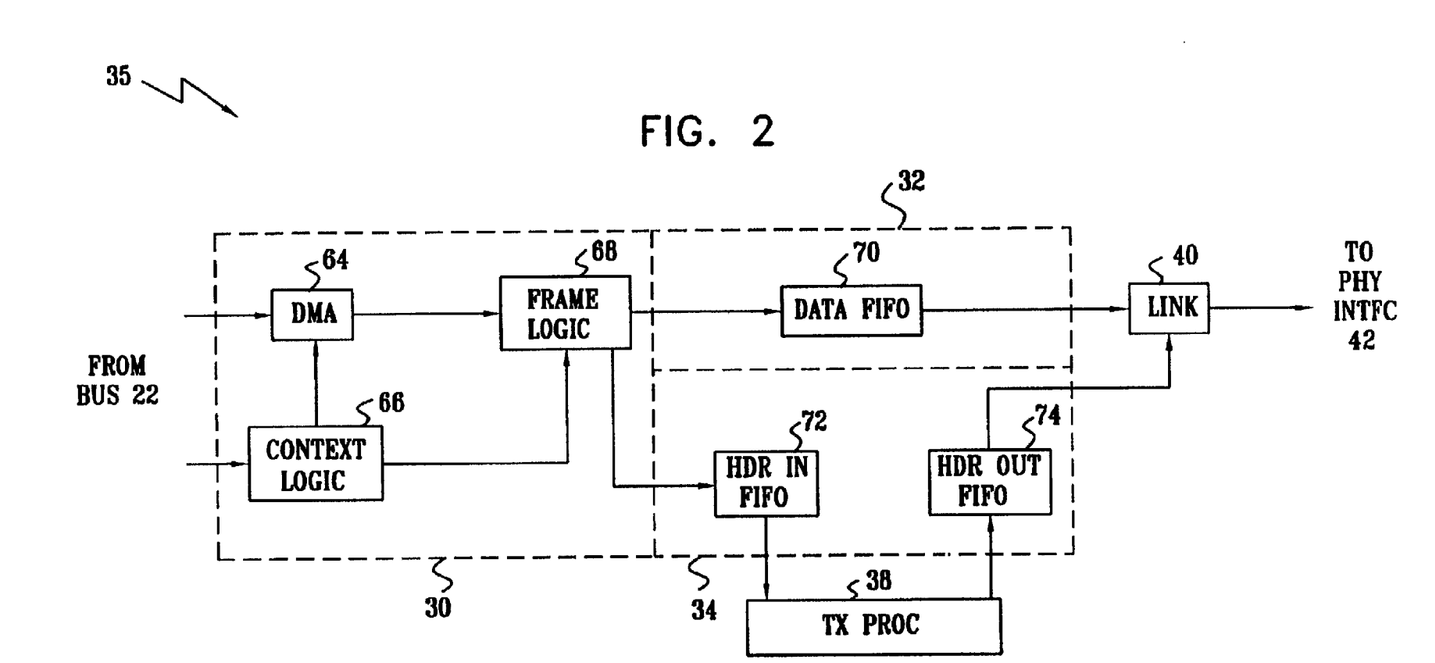
FIG. 2 is a block diagram that schematically shows details of a transmit path in the network interface adapter of FIG. 1, in accordance with a preferred embodiment of the present invention.
Figure 3:
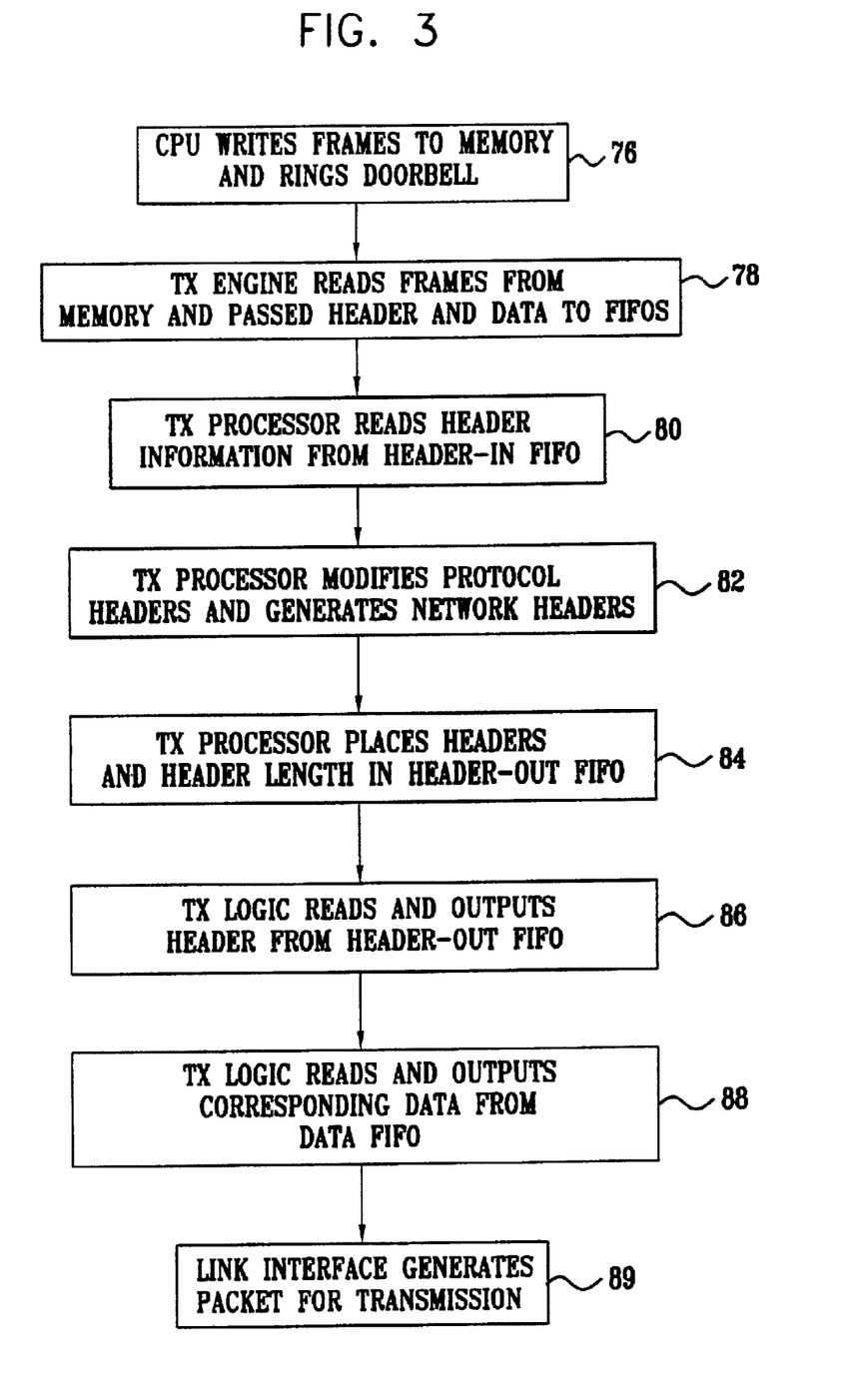
FIG. 3 is a flow chart that schematically illustrates a method for generating packets for transmission over a network, in accordance with a preferred embodiment of the present invention.

Reference is now made to FIGS. 2 and 3, which schematically illustrate a method for processing of data packets for transmission via transmit path 35, in accordance with a preferred embodiment of the present invention. FIG. 2 is a block diagram that shows functional details of the elements of the transmit path. FIG. 3 is a flow chart illustrating a method for packet generation implemented in the transmit path.

CPU 26 prepares data frames in memory 24, to be transmitted over the packet network by adapter 20, under the control of adapter device driver software running on the CPU, at a frame preparation step 76. Along with the frames, the CPU prepares descriptors identifying the frames for purposes of direct memory access (DMA) reading by adapter 20. The frames include both header information and payload data, as well as command information to be used by transmit path 35 in processing the frames for transmission. The command information identifies the communication port (or logical channel) over which adapter 20 is to send the data, and also indicates the length of the frame header and the length of the payload data. This information is used by the transmit path in processing the frame, and specifically in generating packet headers, as described hereinbelow. The transmit path thus relieves the CPU itself of the need to generate the TCP/IP or UDP/IP headers that will be carried by the transmitted packets.

After writing the data frames to memory 24, CPU 26 informs adapter 20 that one or more frames are ready by writing a control word to a "doorbell" address of the adapter on bus 22. Preferably, bus interface 28 supports multiple doorbells, each associated with a different communication port. In this way, application software running on CPU 26 can specify different network channels over which to send data.

The service requests that are invoked by "ringing the doorbells" of the adapter are processed by context logic 66 in transmit engine 30, which drives the operations needed to process the requests, at a frame reading step 78. After selecting a request to process (if more than one doorbell has been rung), logic 66 informs a DMA engine 64 of the address in memory 24 of the next descriptor to be executed. The DMA engine reads the descriptor and, according to the descriptor, reads the data frame from the memory and passes it to frame logic 68 for processing. Based on the header length specified in the data frame by CPU 26, the frame logic passes only the command and header portion of the frame to a header-in FIFO 72 in fast memory 34. The frame logic passes the remaining data in the frame to a data FIFO 70 in transmit logic 32.

When transmit processor 38 receives notification that a new header is waiting to be processed in FIFO 72, it reads the command and header information, at a FIFO reading step 80. Processor 38 modifies the protocol header information provided by CPU 26, as necessary, in order to generate network headers, at a header generation step 82. The generated network headers typically include transport protocol (TCP or UDP) and network protocol (IP) headers, as well as data link layer (media access control, or MAC) headers. These headers are generated under the control of the microcode running on processor 38, based on network routing tables and other information stored in memories 34 and 60. For example, in generating a TCP/IP header, processor 38 would use the port specified by CPU 26 to determine the IP source and destination addresses, along with specifying the total length of the TCP segment and other header parameters. Typically, processors 38 and 52 read the necessary information from shared memory 60 during a start-up phase, before beginning to process outgoing and incoming packets, and store the data that they will need to access during packet processing in memories 34 and 50. The microcode and tables are updated as required to accommodate changes in network topology or protocols, for example.

Transmit processor 38 outputs the processed packet headers to a header-out FIFO 74 in fast memory 34, in a header writing step 84. If the length of the data in a given frame is greater than the maximum packet size permitted in the network, the processor generates multiple packet headers for the frame, corresponding to fragmentation of the frame into multiple packets (for example, multiple TCP/IP packets making up a single TCP frame). By the same token, if the command from CPU 26 indicates that the data frame is to be multicast, processor 38 generates multiple, respective headers for the different multicast destinations. For each header that it writes to FIFO 74, processor 38 also writes an output command, including the length of the header and the length of the corresponding data to be read from data FIFO 70. The processor then notifies transmit logic 32 that a new header is ready for readout from the FIFO.

The transmit logic reads the packet header and command from header-out FIFO 74, at a header readout step 86. Based on the header length and data length specified with the header, the transmit logic reads out the appropriate amount of corresponding data for each packet from data FIFO 70, at a data readout step 88. The transmit logic merges the packet header and data to generate a complete packet. Link interface 40 performs additional data link functions, such as computing and appending error correction codes to the packet, as is known in the art, to prepare the packet for transmission, at a packet output step 89. The packet is then output via physical layer interface 42 to the network.

Figure 4:
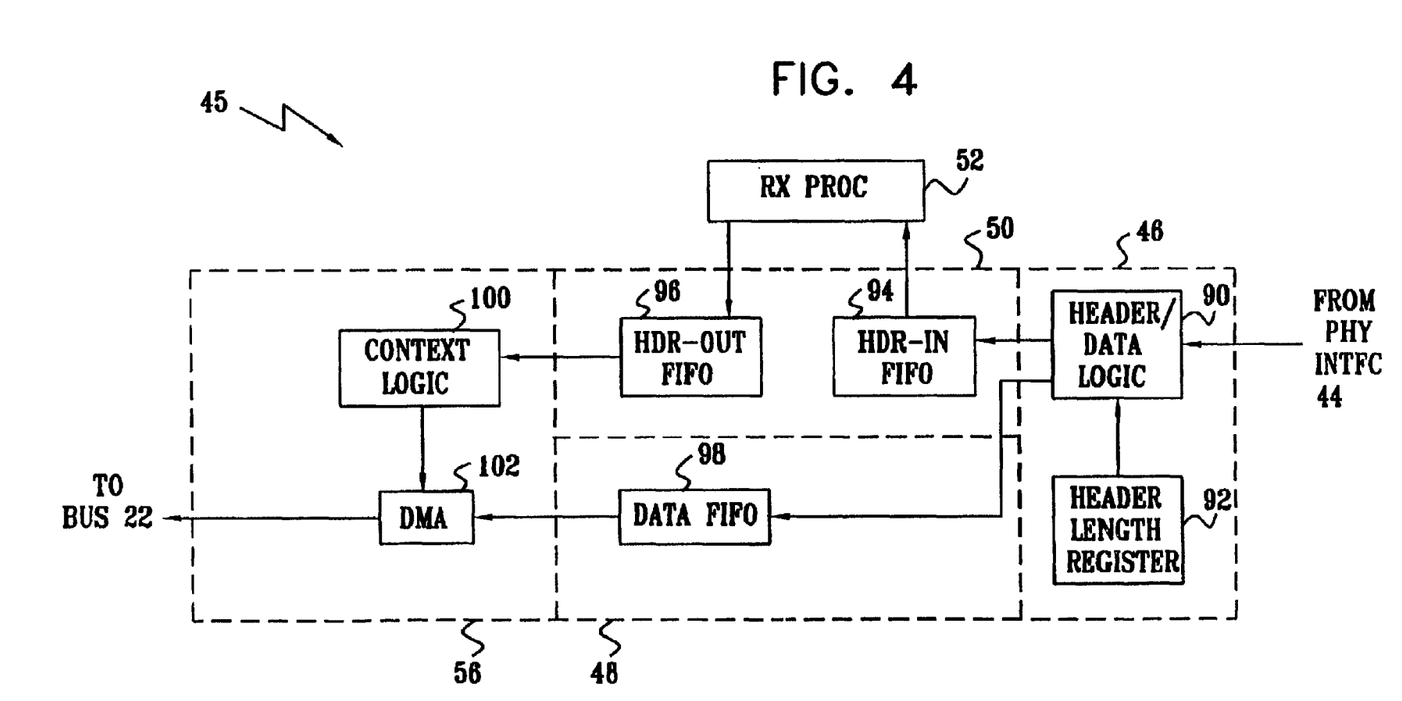
FIG. 4 is a block diagram that schematically shows details of a receive path in the network interface adapter of FIG. 1, in accordance with a preferred embodiment of the present invention.
Figure 5:
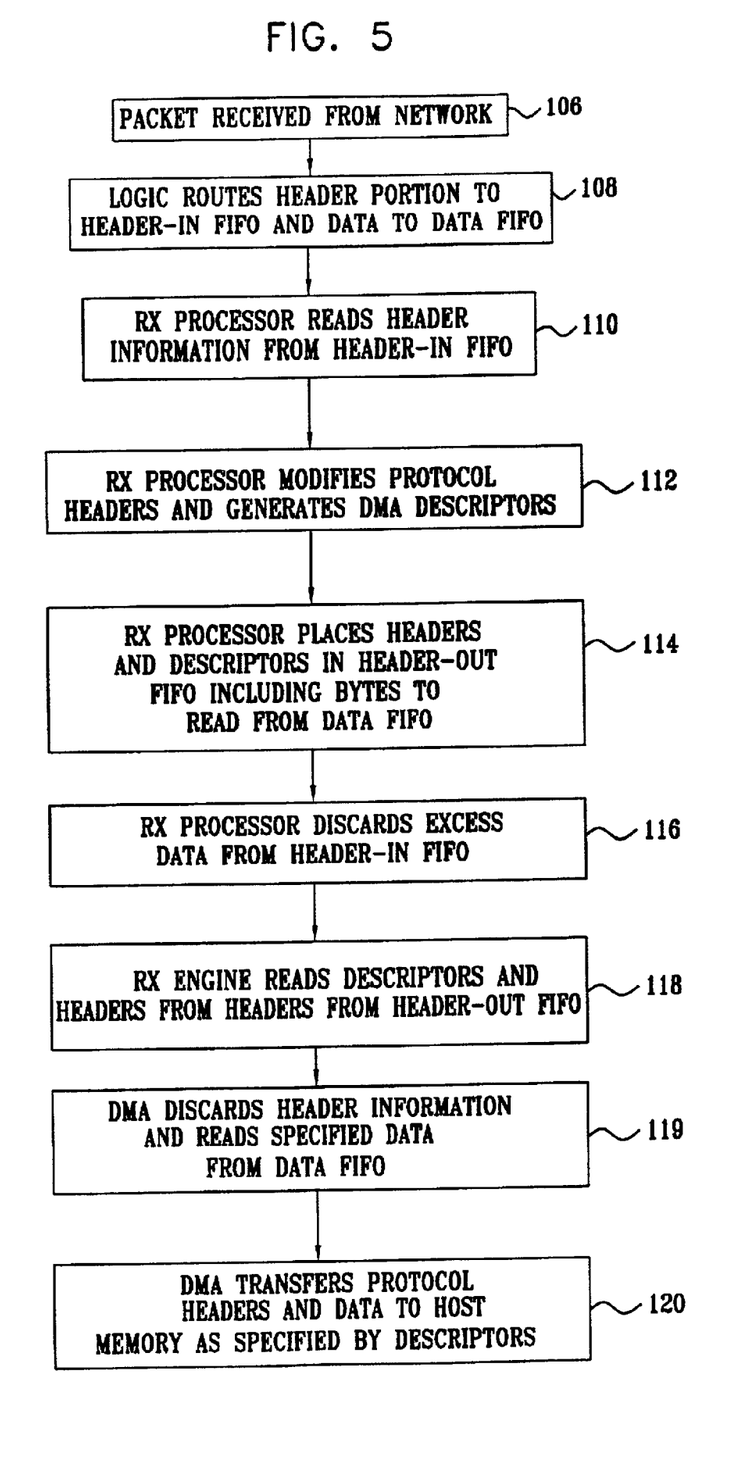
FIG. 5 is a flow chart that schematically illustrates a method for processing packets that are received over a network, in accordance with a preferred embodiment of the present invention.

Reference is now made to FIGS. 4 and 5, which schematically illustrate a method for processing of data packets received from the network by receive path 45, in accordance with a preferred embodiment of the present invention. FIG. 4 is a block diagram that shows functional details of the elements of the receive path. FIG. 5 is a flow chart illustrating a method for packet processing implemented in the receive path.

Data received from the network via physical layer interface 44 are translated into a stream of packets by link layer interface 46, at a packet input step 106. Each such packet contains a header and payload data. Header/data logic 90 routes the header portion of each packet to a header-in FIFO 94 in fast memory 50, while routing the data to a data FIFO 98 in receiver logic 48, at a routing step 108. In many network protocols, however, such as TCP/IP, the header length may vary from packet to packet. Without actually processing the higher-level headers, logic 90 cannot readily determine where the header ends and where the payload data begins in each packet. Therefore, a header length register 92 is programmed with a maximum header length, which is determined according to the protocols in use in the network in question. Thus, for example, if the maximum length allowed for the TCP and IP headers together is 120 bytes (for standard header fields and options), register 92 will be set to 120 bytes. Starting from the beginning of each incoming packet, logic 90 passes the number of bytes specified in register 92 to header-in FIFO 94, even though this number may in some cases include payload bytes, as well. Preferably, the logic passes the entire packet, including both header and payload, to data FIFO 98. Alternatively, some or all of the data that are passed to FIFO 94 may be omitted from FIFO 98.

When a packet header is ready in FIFO 94, receive processor 52 is notified and reads the header data, at a data reading step 110. The processor decodes the headers, starting from the beginning of the packet, and continuing until it has reached the last bit in the highest-level header (such as the TCP header) that it is supposed to process. It modifies the protocol headers as required, and generates commands and descriptors for use in passing the packet data to CPU 26, at a header processing step 112. The commands identify the packet context for the purposes of the application software running on the CPU, while the descriptors indicate the length of the packet header and data to be transferred by receive logic 56 to memory 24. Processor 52 may also be used to implement other functions such as firewalls, based on the TCP port, IP source address, or proprietary rules associated with higher-level protocols; load balancing when there are multiple servers running on the host; and reassembly of IP frames.

Receive processor 52 places the modified headers, descriptors and commands in a header-out FIFO 96 in fast memory 50, at a header writing step 114. As noted above, the commands also identify the bytes of data to be read from data FIFO 98 in order to complete the packet. Preferably, each such command includes an offset and a length. The offset is needed so that any bytes of header information in the data FIFO that have already been processed by processor 52 will not be read from the data FIFO into memory 24. The length indicates the number of bytes contained in the packet payload. Receive processor 52 discards from header-in FIFO 94 any bits remaining in the data received from logic 90 beyond the last header bit that the processor has recognized and processed, at a discard step 116. These bits belong either to higher-level protocol headers, not handled by processor 52, or to payload data. They are therefore not passed through to header-out FIFO 96, and are instead read from data FIFO 98.

Context logic 100 in receive engine 56 reads the information for each incoming packet from header-out FIFO 96, at a descriptor reading step 118. The context logic uses this information to determine a destination address for the packet in memory 24, selected from a range of free memory addresses provided to adapter 20 by CPU 26. The context logic specifies the destination address in a descriptor passed to a DMA engine 102 for processing. In response to this descriptor, the DMA engine reads the header information from header-out FIFO 96 for writing to memory 24. The descriptor also specifies the offset and length of the data to be read for this packet from data FIFO 98. Based on this information, the DMA engine reads any higher-level headers and payload data from data FIFO 98, at a data reading step 119. The excess header information in FIFO 98, which the DMA engine skips based on the offset specified by the descriptor, is discarded. The DMA engine then transfers the headers and data to memory 24, as specified by the descriptors, at a data transfer step 120. When a frame of data has been written to memory 24, CPU 26 is notified, typically by invoking an interrupt to the CPU, and software processing of the frame can proceed.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A network interface device, comprising:

host interface logic, arranged to receive from a host processor a frame of outgoing data that includes outgoing header information and outgoing payload data, the outgoing header information comprising a variable data length parameter, and to separate the header information from the payload data;

an outgoing data memory, coupled to receive the outgoing payload data from the host interface logic;

an outgoing header memory, coupled to receive the outgoing header information from the host interface logic;

a transmit protocol processor, coupled to read and process the outgoing header information from the outgoing header memory so as to generate a plurality of outgoing packet headers in accordance with a predetermined network protocol; and transmit logic, coupled to receive the plurality of outgoing packet headers and to select a corresponding portion of the outgoing payload data from the outgoing data memory, responsively to the data length parameter, for association with each of the packet headers, so as to distribute the outgoing payload data among a sequence of outgoing data packets for transmission over a network in accordance with the protocol.

2. A device according to claim 1, wherein the protocol comprises a network layer protocol.

3. A device according to claim 2, wherein the network layer protocol comprises an Internet Protocol (IP).

4. A device according to claim 1, wherein the protocol comprises a transport layer protocol.

5. A device according to claim 4, wherein the transport layer protocol comprises a Transport Control Protocol (TCP).

6. A device according to claim 4, wherein the transport layer protocol comprises a User Datagram Protocol (UDP).

7. A device according to claim 1, wherein the outgoing data memory and the outgoing header memory comprise parallel first-in-first-out (FIFO) buffers, which are arranged to hold the outgoing payload data and outgoing header information, respectively, for a plurality of frames of outgoing data.

8. A device according to claim 7, wherein the outgoing header memory comprises a first FIFO buffer, coupled to hold the header information before it is processed by the protocol processor, and a second FIFO buffer, coupled to receive the at least one packet header from the protocol processor and to deliver it to the transmit logic.

9. A device according to claim 1, wherein the outgoing header memory comprises a fast memory, coupled to the transmit protocol processor so as to be accessed thereby in a single clock cycle of the processor.

10. A device according to claim 1, wherein at least the outgoing data and header memories and the transmit logic are contained together with the transmit protocol processor in a single integrated circuit chip, and wherein the transmit protocol processor is coupled to the host interface logic so as to enable reprogramming of the transmit protocol processor.

11. A device according to claim 1, and comprising:

receive logic, which is coupled to receive from the network an incoming data packet comprising incoming data that includes an incoming header and incoming payload data, and to select a header portion of the incoming data packet;

an incoming header memory, coupled to receive from the receive logic a header portion of the incoming data, which includes at least the incoming header;

an incoming data memory, coupled to receive from the receive logic a data portion of the incoming data, which includes at least the incoming payload data; and a receive protocol processor, coupled to read and process the header portion of the incoming data in accordance with the predetermined network protocol so as to generate incoming header information, wherein the host interface logic is coupled to receive and associate the incoming header information with the incoming payload data so as to generate an incoming data frame for delivery to the host processor.

12. A device according to claim 11, wherein the transmit protocol processor and the receive protocol processor are contained together in a single integrated circuit chip, and comprising a bus on the chip coupled to both the transmit and receive protocol processors.

13. A device according to claim 12, and comprising a shared memory, which is accessible to both the transmit and receive protocol processors via the bus.

14. A network interface device, comprising:

receive logic, which is coupled to receive from a network in accordance with a predetermined network protocol an incoming data packet comprising incoming data that includes an incoming header and incoming payload data, and which is arranged to select a header portion of the incoming data packet, the receive logic comprising a control register, which is programmable with a length parameter, responsive to which the receive logic determines how many bits to select for inclusion in the header portion;

an incoming header memory, coupled to receive from the receive logic a header portion of the incoming data, which includes at least the incoming header;

an incoming data memory, coupled to receive from the receive logic a data portion of the incoming data, which includes at least the incoming payload data;

a receive protocol processor, coupled to read and process the header portion of the incoming data in accordance with the predetermined network protocol so as to generate incoming header information, which comprises an instruction indicating a length of the payload data to read from the data portion in the data memory for inclusion in an incoming data frame; and host interface logic, which is coupled to receive and associate the incoming header information with the incoming payload data, responsively to the instruction, so as to generate the incoming data frame for delivery to a host processor.

15. A device according to claim 14, wherein the protocol comprises a network layer protocol.

16. A device according to claim 15, wherein the network layer protocol comprises an Internet Protocol (IP).

17. A device according to claim 14, wherein the protocol comprises a transport layer protocol.

18. A device according to claim 17, wherein the transport layer protocol comprises a Transport Control Protocol (TCP).

19. A device according to claim 17, wherein the transport layer protocol comprises a User Datagram Protocol (UDP).

20. A device according to claim 14, wherein the data memory and the header memory comprise parallel first-in-first-out (FIFO) buffers, which are arranged to hold the data portion and the header portion, respectively, for a plurality of frames of incoming data.

21. A device according to claim 20, wherein the header memory comprises a first FIFO buffer, coupled to hold the header portion before it is processed by the protocol processor, and a second FIFO buffer, coupled to receive the header information from the protocol processor and to deliver it to the transmit logic.

22. A device according to claim 20, wherein the header information comprises an instruction to the host interface logic, indicating a length of the payload data to read from the data portion in the data memory for inclusion in the incoming data frame.

23. A device according to claim 14, wherein the data portion of the incoming data comprises substantially all of the incoming data.

24. A device according to claim 14, wherein the outgoing header memory comprises a fast memory, coupled to the receive protocol processor so as to be accessed thereby in a single clock cycle of the processor.

25. A device according to claim 14, wherein at least the incoming data and header memories and the receive logic are contained together with the receive protocol processor in a single integrated circuit chip, and wherein the receive protocol processor is coupled to the host interface logic so as to enable reprogramming of the receive protocol processor.

26. A device according to claim 14, wherein the host interface logic comprises a direct memory access (DMA) engine, and wherein the receive protocol processor is arranged to generate DMA descriptors along with the incoming header information, so that the DMA engine writes the incoming data frame to a memory of the host processor responsive to the descriptors.

27. A method for transmitting data over a packet network, comprising:

receiving from a host processor a frame of outgoing data that includes outgoing header information and outgoing payload data, the outgoing header information comprising a variable data length parameter;

writing the outgoing header information to an outgoing header memory;

writing the outgoing payload data to an outgoing payload memory, separate from the header memory;

reading and processing the outgoing header information from the outgoing header memory so as to generate a plurality of outgoing packet headers in accordance with a predetermined network protocol; and responsively to the data length parameter, selecting a corresponding portion of the outgoing payload data from the outgoing data memory for association with each of the packet headers, so as to distribute the outgoing payload data among a sequence of outgoing data packets for transmission over the network in accordance with the protocol.

28. A method according to claim 27, wherein the protocol comprises a network layer protocol.

29. A method according to claim 28, wherein the network layer protocol comprises an Internet Protocol (IP).

30. A method according to claim 27, wherein the protocol comprises a transport layer protocol.

31. A method according to claim 30, wherein the transport layer protocol comprises a Transport Control Protocol (TCP).

32. A method according to claim 30, wherein the transport layer protocol comprises a User Datagram Protocol (UDP).

33. A method according to claim 27, wherein writing the outgoing header information and writing the outgoing payload data comprise writing the information and the data to parallel first-in-first-out (FIFO) buffers for a plurality of frames of outgoing data in succession.

34. A method according to claim 33, wherein processing the outgoing header information comprises writing the at least one outgoing packet header to a further FIFO buffer in preparation for associating it with the outgoing payload data.

35. A method for processing data received over a packet network, comprising:

programming a control register with a length parameter;

receiving from a network in accordance with a predetermined network protocol an incoming data packet comprising incoming data that includes an incoming header and incoming payload data;

determining how many bits of the incoming data packet to select for inclusion in a header portion responsive to the length parameter;

writing the header portion of the incoming data packet to an incoming header memory, the header portion including at least the incoming header;

reading and processing the header portion of the incoming data from the incoming header memory in accordance with the predetermined network protocol so as to generate incoming header information, which comprises an instruction indicating a length of the payload data for inclusion in the incoming data frame;

responsively to the instruction, writing a data portion of the incoming data to an incoming data memory, separate from the incoming header memory, the data portion including at least the incoming payload data; and associating the incoming header information with the incoming payload data from the incoming data memory so as to generate an incoming data frame for delivery to a host processor.

36. A method according to claim 35, wherein the protocol comprises a network layer protocol.

37. A method according to claim 36, wherein the network layer protocol comprises an Internet Protocol (IP).

38. A method according to claim 35, wherein the protocol comprises a transport layer protocol.

39. A method according to claim 38, wherein the transport layer protocol comprises a Transport Control Protocol (TCP).

40. A method according to claim 38, wherein the transport layer protocol comprises a User Datagram Protocol (UDP).

41. A method according to claim 35, wherein writing the header portion and writing the data portion comprise writing the header portion and the data portion to parallel first-in-first-out (FIFO) buffers for a plurality of frames of incoming data.

42. A method according to claim 41, wherein processing the header portion comprises writing the incoming header information to a further FIFO buffer, in preparation for associating it with the incoming payload data.

43. A method according to claim 41, wherein writing the incoming header information comprises writing an instruction indicating a length of the payload data to read from the data portion in the data memory for inclusion in the incoming data frame.

44. A method according to claim 35, wherein writing the data portion of the incoming data comprises writing substantially all of the incoming data to the incoming data memory.

45. A method according to claim 35, wherein programming the control register comprises determining the length parameter based on a maximum header length permitted by the network protocol.

46. A method according to claim 35, wherein processing the header portion comprises generating a direct memory access (DMA) descriptor, and comprising writing the incoming data frame to a memory of the host processor responsive to the descriptor.

* * * * *